United States Patent [19]

Yamada

[11] Patent Number: 4,628,366
[45] Date of Patent: Dec. 9, 1986

[54] PICTURE SCANNING AND RECORDING METHOD

[75] Inventor: Mitsuhiko Yamada, Kyoto, Japan

[73] Assignee: Dainippon Screen Mfg. Co., Ltd., Kyoto, Japan

[21] Appl. No.: 507,719

[22] Filed: Jun. 23, 1983

[30] Foreign Application Priority Data

Jul. 12, 1982 [JP] Japan .................................. 57-121460

[51] Int. Cl.⁴ ............................................ H04N 1/40
[52] U.S. Cl. ................................... 358/280; 358/282; 358/283; 358/298
[58] Field of Search ................ 358/280, 282, 283, 298

[56] References Cited

U.S. PATENT DOCUMENTS

| | | | |
|---|---|---|---|
| 4,194,221 | 3/1980 | Stoffel | 358/280 |
| 4,208,677 | 6/1980 | Schayes et al. | 358/280 |
| 4,214,276 | 7/1980 | Pugsley et al. | 358/256 |
| 4,279,003 | 7/1981 | Schulz | 358/280 |
| 4,403,257 | 9/1983 | Hsieh | 358/283 |
| 4,496,989 | 1/1985 | Hirosawa | 358/296 |

FOREIGN PATENT DOCUMENTS 3223730 2/1983 Fed. Rep. of Germany .
58-11941 1/1983 Japan .

*Primary Examiner*—John W. Shepperd
*Assistant Examiner*—Edward L. Coles
*Attorney, Agent, or Firm*—Brumbaugh, Graves, Donohue & Raymond

[57] ABSTRACT

In duplication of an original picture in which line drawings coexist therewith, signals obtained by scanning the picture and derived from pictorial elements thereof are processed in such a manner that graphic signals originating from the pictorial elements adjacent one pictorial element of said line drawings are added to a line signal originating from said one pictorial element to thereby prevent a blank unprinted area from taking place along contours of said line drawings recorded on a duplicate.

2 Claims, 11 Drawing Figures

PICTURE SCANNING AND RECORDING METHOD

BACKGROUND OF THE INVENTION

The invention relates to an image scanning and recording method which utilizes such a scanner as is used for the photomechanics or the plate making process. More particularly, it relates to a method for recording an original picture wherein digital signals derived from a pictorial figure of a continuous tone are combined with other digital signals derived from a line drawing or letters of binary levels such as black and white.

Picture scanning and recording apparatus should have in general some kinds of editing functions. For example, a plurality of original pictures are to be recorded on a single photosensitive material according to a predetermined layout. Further in the other cases, a continuously gradated picture and letters or line drawings of binary tones such as black and white have to be synthesized giving a duplicate edited also in accordance with a predetermined layout. Such letters or drawings consist of fine thin lines which produce binary signals when scanned so that a higher resolving power is needed in scanning them than in scanning the pictures of continuous gradation. In the event that the higher power were also applied to said pictures, the overall processing time would be exceedingly prolonged resulting in a serious disadvantage for such a system.

Furthermore, such an excessive resolving power would need of course a higher memory capacity of magnetic discs which are usually utilized for layout operation of data obtained by scanning the picture and letters. This excessive memory capacity will also inevitably prolong the overall processing time.

I have previously proposed a new method for writing into a memory disc a set of picture signals together with a set of line drawings signals. Both the sets of signals have been subjected to a layout operation prior to the writing step, and are stored in the memory disc in such a manner that they can be separated from one another. Said signals are then sequentially read out of the memory disc to thereby produce duplicates in which the image of an original picture coexists with those of the line drawings.

It is, however, to be noted that this previously proposed method has a certain disadvantage despite its various merits. Namely, either a portion of said picture or that of said line drawings is exclusively recorded for each fine element of the picture so that a blank unprinted area is likely to appear along the contour lines of said line drawings duplicated in the abovesaid manner.

FIG. 1 illustrates an example of half-tone image having a blank area.

The references ($P_1$) and ($P_2$) in FIG. 1 respectively indicate a pitch of pictorial elements of the picture and that of the line drawing. A portion (A) of the picture comprises a plurality of dots (A') whose size is in accordance with a density of said portion. A references (C) indicate a blank unprinted area formed along the contour line of a line drawing portion (B).

BRIEF SUMMARY OF THE INVENTION

A primary object of this invention is therefore to provide a method for production of duplicated images in which method sets of signals derived from a graphic picture and a line drawing are used for causing said drawing to coexist with said picture in said images in such a manner that any blank area cannot appear in said duplicated images.

According to the invention, an original picture including characters or line drawing is divided into a plurality of fine pictorial elements which are to be scanned in a primary scanning direction and in a subsidiary direction to thereby generate "graphic signals" originating from the graphic picture as well as "line signals" originating from the line drawing. Each of the fine pictorial elements gives rise either to a "graphic signal" or to a "line signal". Every two adjacent pictorial elements located in the subsidiary scanning direction are compared with each other with regard to the signals derived from them. If said two pictorial elements are in a predetermined relationship, the signals derived from one of said elements is superposingly added to the signals derived from the other element so that a portion of the graphic picture and a portion of the line drawing are recorded on the same portion of a duplicate.

Generally speaking, there is a close correlation between image portions carried by a row of pictorial elements on a scanning line and those carried by the other row of elements located on the adjacent scanning line. Consequently, any unnatural appearance will not result from such an operation that the image informations on one scanning line are overlapped on the other informations on the adjacent scanning line. The line drawing, on the other hand, comprises pictorial elements which are of the same density and are continuously adjoining together. Therefore, said line drawing will never become blurred or indistinct when duplicated even if the abovesaid graphic signals and line signals were overlapped one another to be delivered to a recording or printing device connected to or included in an apparatus which is utilized for performing the invention.

The invention, which is based on the above consideration, will now be outlined with reference to FIG. 2. When a graphic portion (A) adjoins a line drawing portion (B) in the subsidiary scanning direction, data for the pictorial elements located on a scanning line which is delivering signals for duplication are compared with other data originating from the adjacent scanning line. According to the result of such a comparison, the graphic signals originating from one of said adjoining scanning lines are added to the line signals originating from the other scanning line. For example, pictorial elements ($B_1$) ($B_2$) corresponding to a portion of line drawing positioned on a scanning line ($L_4$) in FIG. 2 are recorded on a duplicate after the line signals obtained from said elements ($B_1$) ($B_2$) have been added to the graphic signals obtained from the other pictorial elements ($A_1$) ($A_2$) corresponding to a portion of graphic picture positioned on the adjacent scanning line ($L_3$). Further, when pictorial elements ($B_3$) representing a line drawing portion or a scanning line ($L_2$), graphic signals of pictorial elements ($A_3$) on the adjacent scanning line ($L_1$) are previously added to line signals originating from the former pictorial elements ($B_3$). It is thus possible to prevent the blank unprinted area from appearing along the contour of said linear drawing.

Other objects and advantages of the invention will become apparent along the following description referring to an embodiment shown in the drawings.

DETAILED DESCRIPTION OF PREFERRED EMBODIMENT

Figure 3:
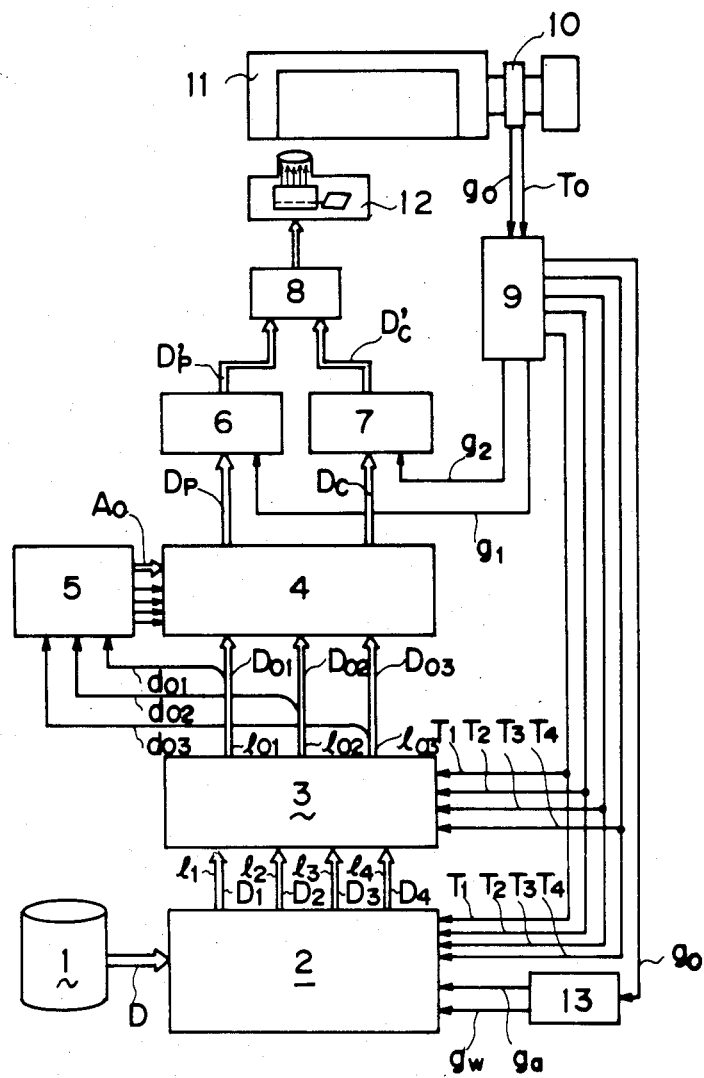
FIG. 3 is a block diagram of an apparatus available for performance of the invention.

Now referring to FIG. 3, the illustrated apparatus is adapted to carry out the invented method and comprises a memory device such as a disk storage 1. The disk storage 1 has therein a set of composite signals synthesized or integrated from graphic signals and character signals respectively stored in different disk storages. The manner of said synthesis or integration does not fall within the scope of the invention so that it is merely outlined here. The graphic signals and the character signals are sequentially called into a layout station comprising a central processing unit (CPU), a parchromatic cathode ray tube (CRT) or other monitoring device, and a digitizing tabulator. The layout station compiles said signals to produce the set of composite signals according to a predetermined layout.

The invention as carried out by means of the illustrated apparatus provides such a method that the graphic signals and line signals stored in the disk storage 1 are read out of there in sequence to record or print a duplicated image in which a graphic picture coexists with a line drawing without any blank unprinted area therebetween.

Figure 1:
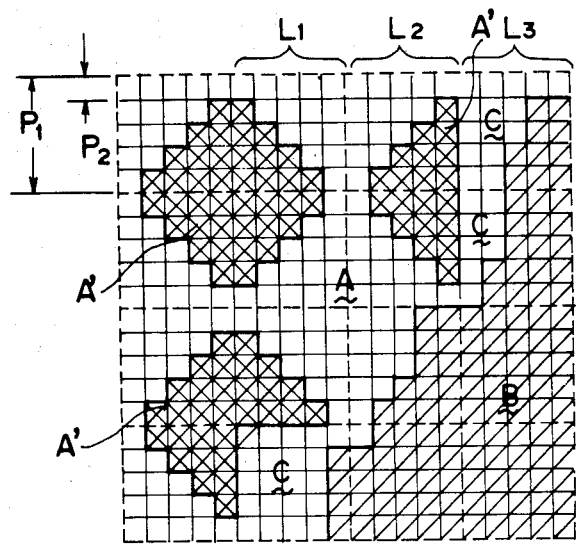
FIG. 1 is a diagram schematically showing a blank unprinted area which takes place along a contour of a line drawing coexisting with a graphic picture in a duplicate.

A higher resolving power is applied to the line signals stored in said disk 1, as shown in FIG. 1. In other words, a plurality of pictorial elements of the line drawing (single element being a smaller square having a side $P_2$) correspond to one pictorial element of the graphic picture (being a bigger square having a side $P_1$). Each of said graphic and line signals comprises a plurality of bits, one of which serves as a discrimination bit to distinguish the graphic signals from the line signals when they are discharged from the disk storage 1.

Figure 4:
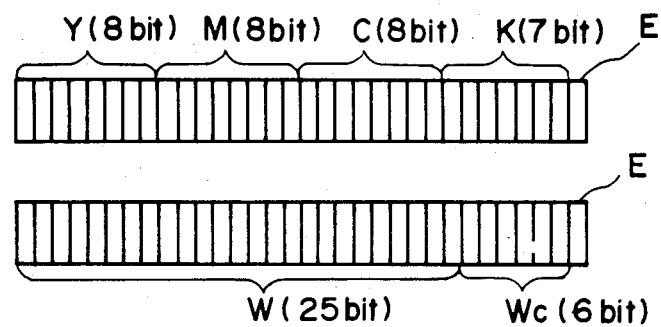
FIG. 4 shows examples of data formats for receiving a graphic signal and a character signal, respectively.

FIG. 4 illustrates an example of data formats applied to said two kinds of signals stored in predetermined addresses of the storage 1.

The data format shown on the upper tier in FIG. 4 is for the graphic signals and comprises thirty two bits divided into five groups. Namely, first three groups each having a length of eight bits are respectively allotted to elementary signals for yellow plate Y, magenta plate M and cyan plate C, in this order. The next group has a length of seven bits allotted to black plate K and the last one is the abovementioned discrimination bit E. The lower tier in FIG. 4 is the data format used for the line signals and comprising three groups of bits. The first of them has a length of twenty five bits allotted to an elementary signal W constituting the line signal while the second of them having a length of six bits being allotted to a color selection signal $W_c$ added to said elementary signal W. The last one is of one bit length allotted to the discrimination signal E.

Said selection signal $W_c$ serves to determine a color given to the line drawing such as letters. Any of the known techniques for representing color by six bits can be used.

Data are read out of the disk storage 1 and delivered to a control circuit 2 comprising a buffer storage and four output lines. For data $D_1$ to $D_4$ which are produced by four main scanning lines adjacent each other in the subsidiary scanning direction are processed by the control circuit in a manner such that three of said four output lines $l_1$ to $l_4$ are simultaneously activated to transmit output data.

Figure 5:
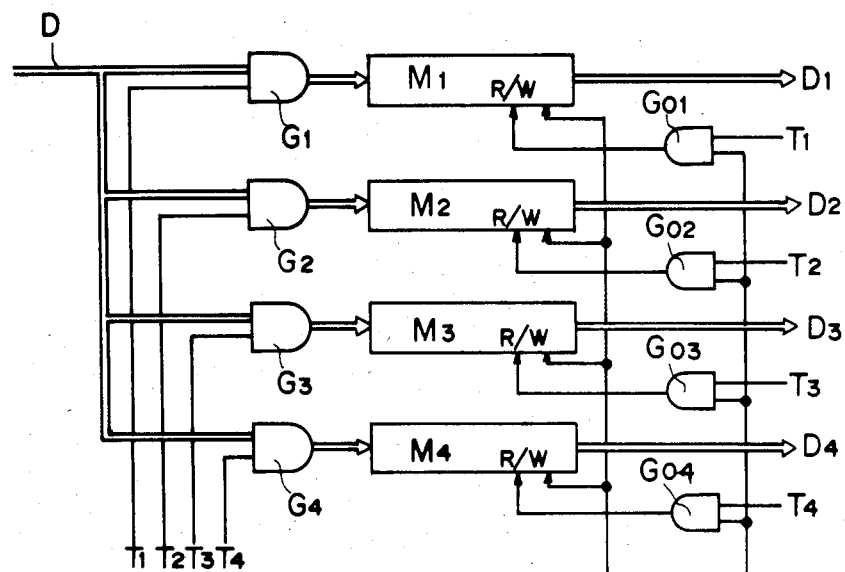
FIG. 5 shows a control circuit incorporated in said apparatus.

FIG. 5 illustrates an example of the control circuit 2. As shown in FIG. 5, the input line transmitting the abovesaid data D is divided into four lines. Consequently, the data D is fed at the same time to four buffer storages $M_1$ to $M_4$ respectively through AND gates $G_1$ to $G_4$. These AND gates are being supplied with timing pulses $T_1$ to $T_4$ (FIG. 6) sequentially generated by a timing pulse generator 9. Said gates $G_1$ to $G_4$ are therefore opened for a period of time one after another, the time corresponding to a scanning time necessary for one scanning line. The plural series of said data D from the scanning lines are thus distinguished from each other to thereby be stored in the buffer storages $M_1$ to $M_4$, respectively.

Figure 6:
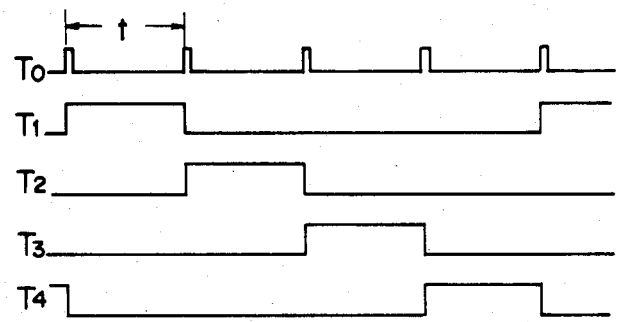
FIG. 6 is a time chart of timing pulses.

In FIG. 6 showing a time chart of the timing pulses $T_1$ to $T_4$, the reference $T_o$ indicates start pulses each of which is generated by a rotary encoder 10 for each rotation of a recording cylinder 11. The start pulses $T_o$ determine the starts of recording functions executed for each scanning line at an interval t.

Figure 2:
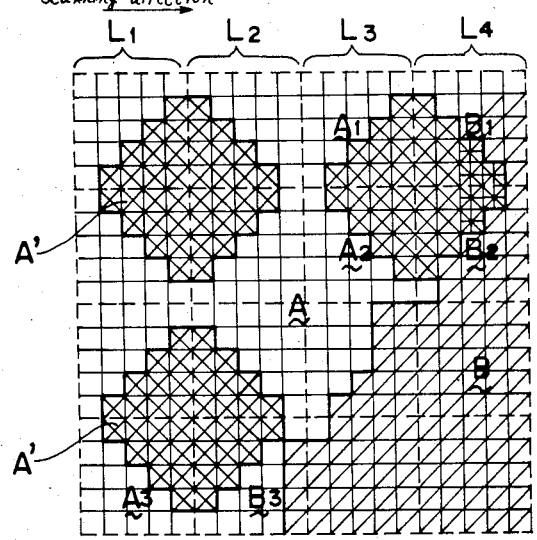
FIG. 2 is a similar diagram illustrating a principle for avoiding the occurrence of said blank area.

Write and read of the data D to and from the buffer storages $M_1$ to $M_4$ are controlled by a read-write command signals $g_w$ given to read-write terminals R/W. This signal $g_w$ is derived from an address generator 13 and delivered to said terminals R/W when any one of further AND gates $G_{o1}$ to $G_{o4}$ is supplied with one of the timing pulses $T_1$ to $T_4$ at its one terminal and simultaneously with the signal $g_w$ at its other terminal. The reference $g_a$ indicates an addressing signal given by the address generator 13 to said buffer storages $M_1$ to $M_4$. Said generator 13 thus produces the read-write command signal $g_w$ as well as the addressing signal $g_a$ in accordance with sampling pulses $g_o$ generated at the timing pulse generator 9. The above timing pulses $T_1$ to $T_4$ have their high level states alternately at the interval t as shown in FIG. 6. Thus, when the pulse $T_1$ is at its high level state, the data series which have been obtained for a certain scanning line and now are being read out from the disk storage 1 will be written on the buffer storage $M_1$ while the other data series which have previously been written on the other buffer storages $M_2$ to $M_4$ being concurrently read out therefrom for the other adjacent scanning lines. Similar data processing would be performed even when any one of the other timing pulses $T_2$ to $T_4$ were at high level state. It will now be apparent that when the data $D_4$ of the scanning line $L_4$ shown in FIG. 2 are being read out of the disk storage 1 to thereafter be written on the buffer storage $M_4$ the other data $D_1$ to $D_3$ of the other scanning lines $L_1$ to $L_3$ are synchronously read out of the buffer storages $M_1$ to $M_3$, respectively.

A sequencing circuit 3 shown in FIG. 3 is supplied with any three of the four series of data $D_1$ to $D_4$ in order that these three data series are arranged in sequence in view of their scanning lines. This sequencing operation is as follows. Namely, one series of data derived from the central scanning of said three scanning lines are always output onto the central output line $l_{o2}$ whereas the other two data series of the right and left scanning lines adjacent said central scanning line are discharged from the sequencing unit onto its other, i.e., side output lines $l_{o1}$ and $l_{o3}$.

Figure 7:
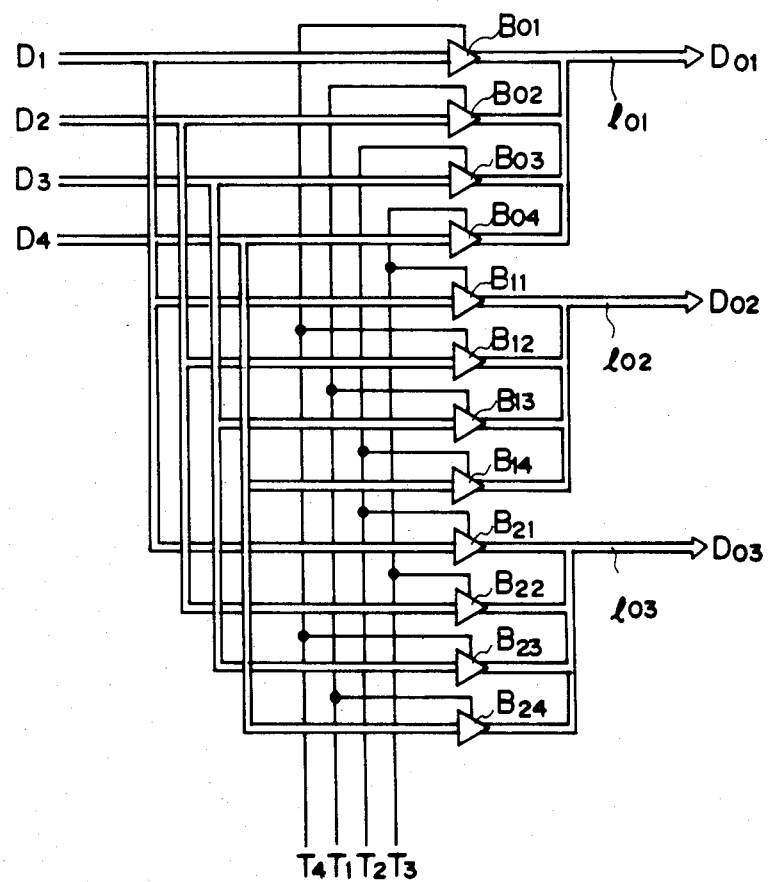
FIG. 7 shows a sequencing circuit in said apparatus.

FIG. 7 illustrates an example of the sequencing circuit 3. Each of the data series $D_1$ to $D_4$ is fed at the same time to three tri-states buffers $B_{o1}$, $B_{11}$ and $B_{21}$, or $B_{o2}$, $B_{12}$ and $B_{22}$, or $B_{o3}$, $B_{13}$ and $B_{23}$, or $B_{o4}$, $B_{14}$ and $B_{24}$. Applied to their control terminals are the timing pulses $T_1$ to $T_4$. As seen from FIG. 7, the abovementioned sequencing effect will be obtained in a manner described below in order to output for example the data $D_{o2}$ of the central scanning line $l_2$ onto the central output line $l_{o2}$. That is to say, the data $D_1$ to $D_3$ are caused to leave the control circuit 2 in case of the high level state of the pulse $T_4$ wherein the data $D_2$ have to correspond to for example the central scanning line $L_2$ shown in FIG. 2 and the other data $D_1$ and $D_3$ have to correspond to the left and right scanning lines $L_1$ and $L_3$, respectively. In accordance with this, the timing pulse $T_4$ at its high level state is applied to the tri-states buffers $B_{o1}$, $B_{12}$ and $B_{23}$ at their control terminals so as to activate these buffers to conduct the data therethrough. Thus, the data $D_1$, $D_2$ and $D_3$ are respectively discharged onto the left, central and high output lines $l_{o1}$, $l_{o2}$ and $l_{o3}$. Supposing that data from a scanning line (not shown) located on the right hand of the scanning line $L_4$ is read out of said disk storage according to the timing pulse $T_1$, then this pulse will be given to the tri-states buffers $B_{o2}$, $B_{13}$ and $B_{24}$. As the result, the data $D_2$, $D_3$ and $D_4$ are also respectively obtained on the left, central and right output lines $l_{o1}$, $l_{o2}$ and $l_{o3}$.

The next step of data processing is an adjusting step performed at a compensating circuit 4 shown in FIG. 3. The data $D_{o1}$ to $D_{o3}$ arranged in sequent order of the scanning lines are here properly treated in order to avoid the blank unprinted area from taking place along said contour lines of duplicated characters or letters.

The data $D_{o2}$ transmitted through the central output line $l_{o2}$ are utilized as the main data in duplicating the images. As described on the beginning portion, each data of pictorial element derived from all the scanning lines comprises the discrimination bit by which the pictorial elements are judged whether they originate from portions of a graphic drawing in an original picture or not. In other words, a data having the discrimination bit of "0" (zero) is derived from said graphic drawing while a data having the bit of "1" (one) thereby corresponding to a portion of the line drawing.

Table 1 shows eight cases a to h that are classified by means of a combination of three data being of the same or different kinds and respectively derived from three scanning lines adjacent each other in the subsidiary scanning direction wherein the references "0" and "1" indicate the graphic drawing and the linear drawing, respectively.

TABLE 1

| cases | a | b | (c) | (d) | e | f | (g) | h |
|---|---|---|---|---|---|---|---|---|
| right scanning line | 0 | 0 | 0 | 0 | 1 | 1 | 1 | 1 |
| central scanning line | 0 | 0 | 1 | 1 | 0 | 0 | 1 | 1 |

TABLE 1-continued

| cases | a | b | (c) | (d) | e | f | (g) | h |
|---|---|---|---|---|---|---|---|---|
| left scanning line | 0 | 1 | 0 | 1 | 0 | 1 | 0 | 1 |

Among the eight cases, the cases c, d, g and h are including the data discriminated to be that derived from a portion of the line drawing, the portion being located on the central scanning line. Thus, these cases c, d, g and h are representing the possibility that said blank area may appear.

Figure 8:
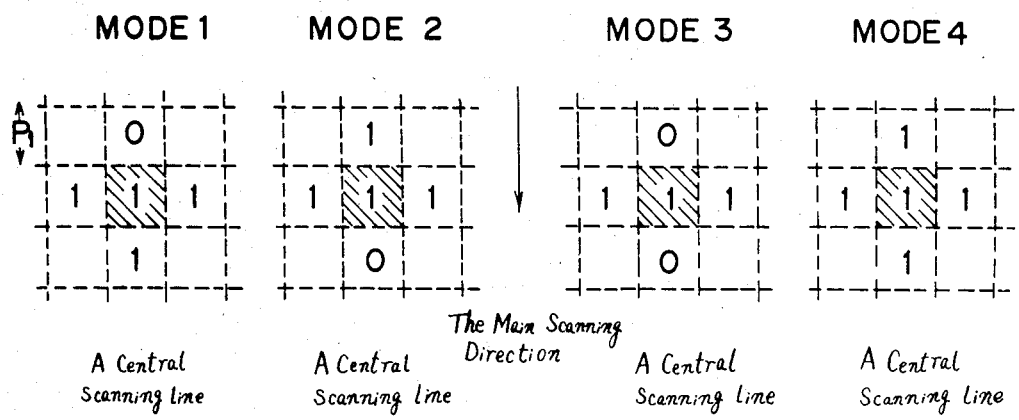
FIG. 8 is classifying theoretically into some states the pictorial elements positioned on scanning lines adajacent a central scanning line.

Discrimination bits $d_{o1}$ to $d_{o3}$ of said three data $D_{o1}$ to $D_{o3}$ are fed to a decision circuit 5 which decides the case that conforms to the trio of said data $D_{o1}$ to $D_{o3}$. The compensating circuit 4 is thus activated only when the trio is classified as the case c, d, g or h. The above decision by the circuit 5 is executed at the pitch $P_1$ of pictorial elements. For instance, when the trio of data conforms to the case c, then an average value of the two "graphic" signals or data on the right and left scanning lines is added to the "line" signals or data on the central scanning line so as to be output from the compensating circuit 4. In the event that the decision circuit 5 decides the case to be d or g, the "graphic" data on the right or left scanning line will be similarly added to said "line" data on the central scanning line and be output therewith. A quite different manner is on the other hand adopted for processing the three data classified as the case h since both the right and left scanning lines are producing the "line" data. Namely, a further decision will be necessary which is as shown in FIG. 8 adapted to divide the case h into four modes i.e., MODE 1 to MODE 4. These modes are defined by referring to data of pictorial elements located just before and after the central element on the central scanning line (the central element being shaded with oblique lines in FIG. 8) when seen in the primary scanning direction. The MODE 1 means that the "graphic" data of the pictorial element preceding said central element is to be added to the "line" data thereof before output from the circuit 4. Similary, the MODE 2 dictates to said circuit an addition of the data of the element succeeding said central element to said "line" data. In case of the MODE 3, a processing manner similar to those of the MODEs 1 and 2 may be adopted. It is also possible to calculate an average of the two "graphic" data adjacent the central "line" data so that said average can be added thereto as described hereinafter instead of directly adding the adjacent "graphic" data to said "line" data. There is no "graphic" data, in MODE 4, adjacent the central "line" data shaded with oblique lines. Consequently, a quite different way of data processing will be required for the MODE 4 as mentioned below.

Figure 9:
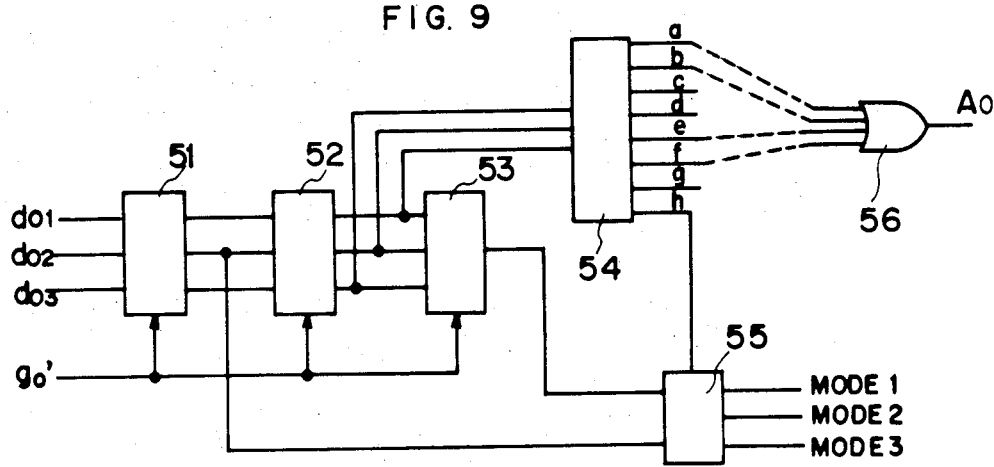
FIG. 9 shows a decision circuit.

FIG. 9 shows an example of the decision circuit 5 comprising latch circuits 51, 52 and 53, decoders 54 and 55 and an OR gate 56.

The aforedescribed discrimination bits $d_{o1}$ to $d_{o3}$ carried by the data $D_{o1}$ to $D_{o3}$ of the adjacent scanning lines are transmitted from the sequencing circuit 3 to the decoder 54 through the latch circuits 51 and 52. A combination of these bits is examined and one of the cases a to h shown in Table 1 is assigned for the combination by the decoder 54. If the case is a, b, e or f, a discriminating signal $A_o$ will be generated at said decoder and fowarded to a further processing device through the OR gate 56. The signal $A_o$ indicates that the data $D_{o2}$ of the pictorial element on said cental scanning line is the "graphic" data. If the case is c, d or g, another discriminating signal will be generated which indicates that the data $D_{o2}$ is the "line" data and an appropriate graphic data must be added thereto in the compensating circuit 4 in a manner detailed hereinafter.

Figure 10:
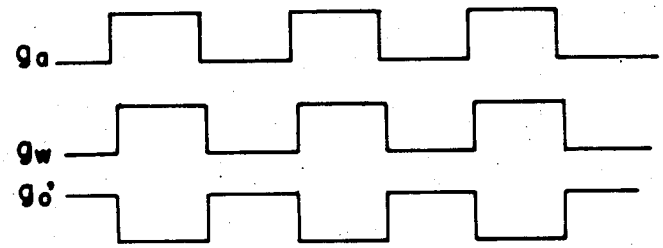
FIG. 10 is a time chart of a further timing pulse.

If a still another discriminating signal is generated for the case h by the decoder 54, data of the pictorial elements located before and after the central element that is to be recorded are delivered to the other decoder 55 from the latch circuit 51 and 53 whereby the MODE 1, 2, 3 or 4 is selected. Timing pulses $g_o{'}$ shown in FIG. 10 will control the timings by which the above data are latched by the latch circuits 51, 52 and 53. The clock pulses $g_a$ and the command signals $g_w$ are used for addressing the buffer storages $M_1$ to $M_4$ shown in FIG. 4 and for control of the read-write operation thereof, respectively.

Before entering into a detailed description of the compensating circuit 4, it is to be noted that the data $D_{o1}$ to $D_{o3}$ are fed to the circuit 4 synchronously when their discrimination bits $d_{o1}$ to $d_{o3}$ are supplied to the decision circuit 5.

Figure 11:
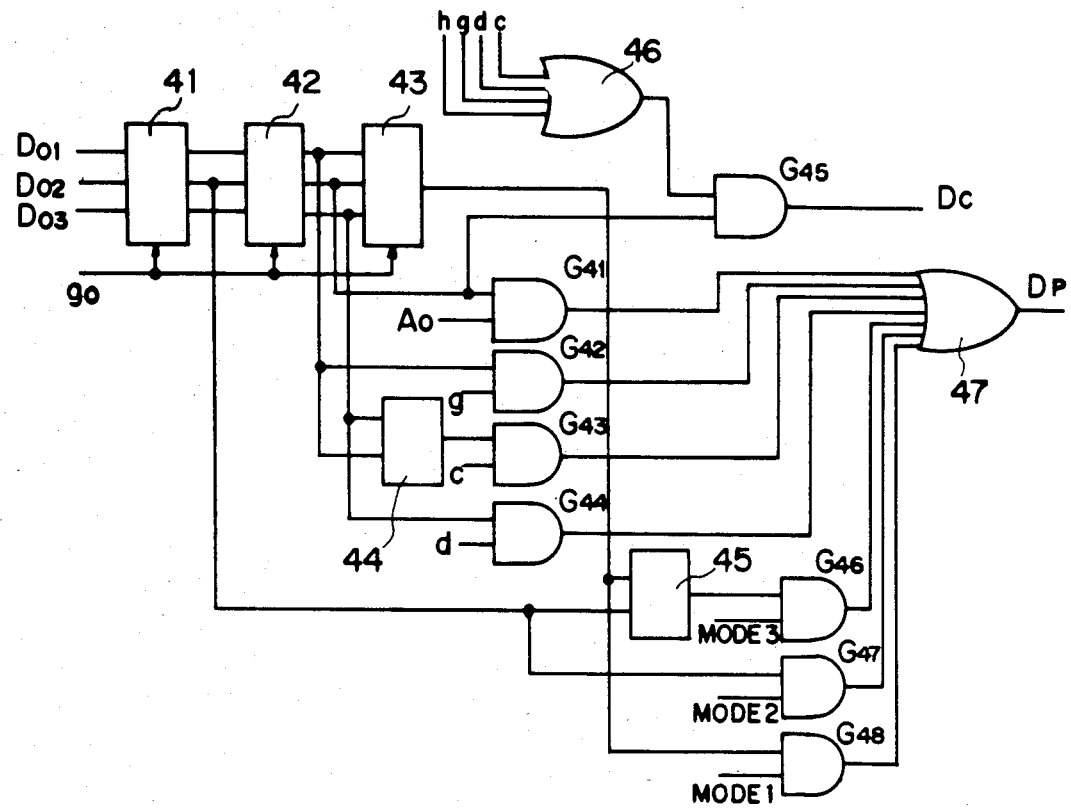
FIG. 11 shows an example of a correction circuit also incorporated in said apparatus.

FIG. 11 shows an example of the compensating circuit 4 comprising latch circuits 41 to 43, average value calculators 44 and 45, AND gates $G_{41}$ to $G_{48}$ and OR gates 46 and 47.

The data $D_{o1}$ to $D_{o3}$ are delivered from the latch circuit 42 to the other devices in the adjusting circuit 4 synchronously with the feed of discriminating signals $A_o$, c, d, g and h from the decision circuit 5. The data $D_{o2}$ represents the central pictorial element that is located on the central scanning line and is to be recorded now while the other data $D_{o1}$ and $D_{o3}$ originating from the right and left scanning lines, as mentioned above.

Operation of said circuit 4 is as follows. In case that the discriminating signal $A_o$ is given to the circuit 4 by the circuit 5, the data $D_{o2}$ is regarded as the "graphic" signal and forwarded through the AND gate $G_{41}$ and the OR gate 47 directly to a dot forming circuit 6 as indicated at $D_p$. In case that the discriminating signal d or g is supplied to the compensating circuit 4 by the decision circuit 5, said data $D_{o2}$ is regarded as the "line" signal and the right or left data $D_{o1}$ or $D_{o3}$ is regarded as the "graphic" signal. In such a case, the $D_{o1}$ or $D_{o3}$ will be sent to the dot forming circuit 6 via the AND gate $G_{42}$ or $G_{44}$ and via the OR gate 47 whereas the data $D_{o2}$ sent via the AND gate $G_{45}$ to a further latch circuit 7 located separate from the circuit 4 as shown in FIG. 2. The "line" signal $D_{o2}$ is indicated at $D_c$ in FIGS. 11 and 2. Further, in case that the discriminating signal c is transmitted from the circuit 4 to the circuit 5, the data $D_{o2}$ is also the "line" signals and both the adjacent data $D_{o1}$ and $D_{o3}$ are the "graphic" signals so that the data $D_{o2}$ is fed to the latch circuit 7 as indicated at $D_c$ while the data $D_{o1}$ and $D_{o3}$ being processed by the average calculator 44 so as to produce an average value thereof that is to be charged into the dot forming circuit 6 via the AND gate $G_{43}$ and said OR gate 47 as indicated at $D_p$.

In the event of a discrimination signal h being given to the compensating circuit 4, the data $D_{o2}$ of the pictorial element located on said central scanning line is a "line" signal which is to be discharged from said circuit 4 as indicated at $D_c$. The other data adjacent the data $D_{o2}$ have to be processed depending upon the aforementioned MODEs. If the decision circuit 5 generates the signal MODE 1 and inputs it to the compensating circuit 4, the latch circuit 43 will output a data $D_p$, i.e. "graphic" data, also to the circuit 4 by means of the AND gate $G_{48}$ and the OR gate 47, the data $D_p$ here originating from a pictorial element that has been recorded just prior to the abovesaid element. In MODE 2, the other latch circuit 41 located upstreamly of the circuit 43 will output through the gates $G_{47}$ and 47 another data $D_p$ which originates from another pictorial element located just after said element now being recorded.

When the signal MODE 3 is given by the circuit 5 to the circuit 4 together with the discrimination signal h, the average value calculator 45 averages the data $D_{o1}$ and $D_{o3}$ respectively representing said adjacent pictorial elements located just prior and after the outstanding central element. This average value is treated as the "graphic" data $D_p$ and discharged from the calculator 45 through the AND gate $G_{46}$ and the OR gate 47 to the dot forming circuit 6.

In MODE 4, the central element shown in FIG. 8 produces a "line" data $D_c$ which can be processed without being adjusted. Such a processing will be effected by merely supplying the other OR gate 46 with the discrimination signal h together with the signals c, d and g.

Thus, the "graphic" data $D_p$ from the OR gate 47 are successively delivered to the next stage, i.e. the dot forming circuit 6, while the "line" data from the AND gate $G_{45}$ being also successively delivered to the further latch circuit 7.

The dot forming circuit 6 has a structure adapted to successively convert the supplied "graphic" data $D_p$ into a plurality of half-tone signals $D_p{'}$ in accordance with control pulses $P_1$ from the timing pulse generation 9. This process is disclosed in the abovesaid Japanese Patent Application No. Sho. 57-39877. Said half-tone signals $D_p{'}$ are given to an adder 8 connected to a recording head 12. On the other hand, the other control pulses $P_2$ from said generator 9 causes the latch circuit 7 to convert the supplied "line" data $D_c$ into a plurality of five bits "line" data in time series. The converted "line" data are then delivered to said recording head 12 via the adder 8. The head 12 emits plural exposing beams for recording one pictorial element. More details thereof should be referred to the No. Sho. 57-39877.

In the foregoing description, a disk storage having a layout of the "graphic" and "line" signals stored therein is used for recording a duplicate in which a graphic picture and line drawings such as characters coexist. It is however possible to apply the invention a case where an original picture is simultaneously scanned together with line drawings for directly recording them on a duplicate to coexist thereon with each other. The invention is also applicable to such an occasion that said "graphic" data and "line" data have not the same data format but different formats as disclosed in another Japanese Patent Application No. Sho. 56-111111 in the name of the applicant of the present invention. Each pictorial element in No. Sho. 56-111111 is provided with a "graphic" signal and a "line" signal so that the graphic signal of one element is utilized not only to adjust an adjacent element signal but also to adjust said one element perse.

What is claimed is:

1. A method for recording a reproduced image in a desired layout based on image data obtained by photoelectrically scanning an original picture, a line drawing and a picture pattern existing mixedly in the reproduced image, the method comprising the steps of:

storing line drawing data and picture pattern data, obtained from photoelectrically scanning the original, in a memory sequentially reading the image data, including the line drawing data and the picture pattern data, out of said memory in the order of record scanning lines, said image data being represented as an image signal for each picture element of the original picture in the form of one of said line drawing data or said picture pattern data, both being on data formats of equal length;

providing each of said data formats with a discrimination bit for discriminating whether the image data represented on a data format are line drawing data or picture pattern data;

arranging the image data of a required picture element on a first scanning line to be recorded and the image data of a picture element on a scanning line adjacent to said first scanning line in the sequential order of scanning lines;

and discriminating the arranged image data and, when the image data of a first picture element on a central scanning line to be recorded are line drawing data when discriminated, outputting the picture pattern data of a picture element adjacent to said first picture element in a subscanning line to said first picture element by superimposing the picture pattern data on the line drawing data, the output of the picture pattern data being controlled per one picture element, and the output of the line drawing data being controlled per one subpicture element obtained by further dividing said first picture element.

2. A method as defined in claim 1, wherein said discriminating step includes outputting the picture pattern data of said first picture element in the main scanning direction to said picture element by superimposing said picture pattern data on the line drawing data when it is found by discriminating the arranged data that the image data of the first picture element on the central scanning line to be recorded are the line drawing data and that a picture element adjacent in the subscanning line is also the line drawing data.

* * * * *